United States Patent [19]
Tanksley

[11] 3,922,860
[45] Dec. 2, 1975

[54] FLOATING BOOM HAVING ROTATABLE FLOAT ELEMENTS

[75] Inventor: Neeld D. Tanksley, Walnut Creek, Calif.

[73] Assignee: Pacific Pollution Control, Emeryville, Calif.

[22] Filed: Sept. 30, 1974

[21] Appl. No.: 510,290

[52] U.S. Cl. ................................. 61/1 F
[51] Int. Cl.² .......................... E02B 15/04
[58] Field of Search..... 61/1 F, 5; 210/242, DIG. 21

[56] References Cited
UNITED STATES PATENTS

| | | | |
|---|---|---|---|
| 3,664,504 | 5/1972 | Ayers et al. | 61/1 F X |
| 3,740,955 | 6/1973 | Fossberg | 61/1 F |
| 3,798,913 | 3/1974 | Dubois | 61/1 F |
| 3,807,177 | 4/1974 | Oberg | 61/1 F |
| 3,807,617 | 4/1974 | Tanksley | 61/1 F X |
| 3,859,797 | 1/1975 | Ayers | 61/1 F |

FOREIGN PATENTS OR APPLICATIONS

| | | | |
|---|---|---|---|
| 2,009,655 | 2/1970 | France | 61/1 F |

*Primary Examiner*—Paul R. Gilliam
*Assistant Examiner*—David H. Corbin
*Attorney, Agent, or Firm*—Warren, Chickering & Grunewald

[57] ABSTRACT

A floating boom for use in containment and control of floating pollutants, such as oil, is disclosed. The boom includes an elongated sheet-like partition and a plurality of float means mounted to the partition at periodic intervals over the length thereof. The float means include plate-like float elements mounted to the float means for rotation about a horizontal axis to and from a deployed position, for floating support of the boom, and a relatively rotated stored position, which enables a substantial reduction in the bulk of the boom. The float elements are biased by buoyancy and gravity forces to the deployed position, and the partition is formed as a flexible member to enable folding of the boom with the float elements thereon into a compact package. A method of folding the boom for compact storage and rapid deployment is also disclosed.

10 Claims, 4 Drawing Figures

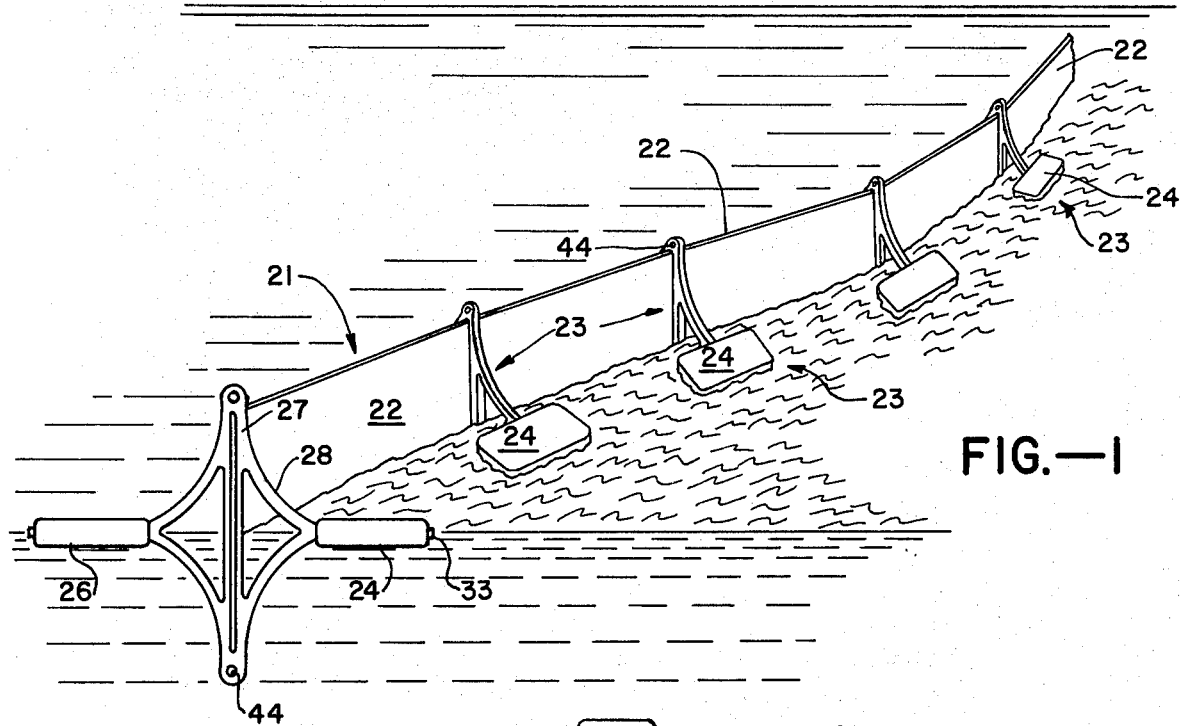
FIG.—1
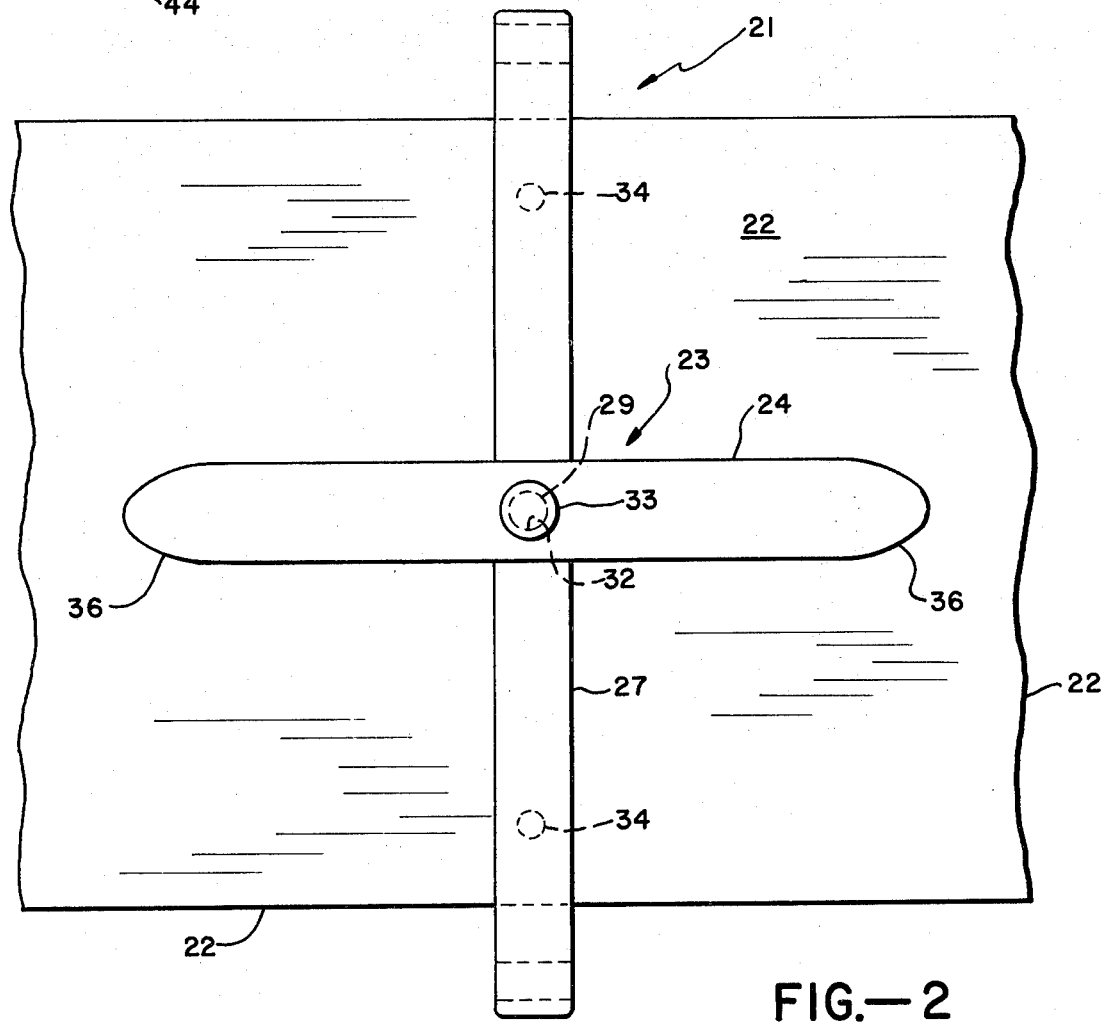
FIG.—2

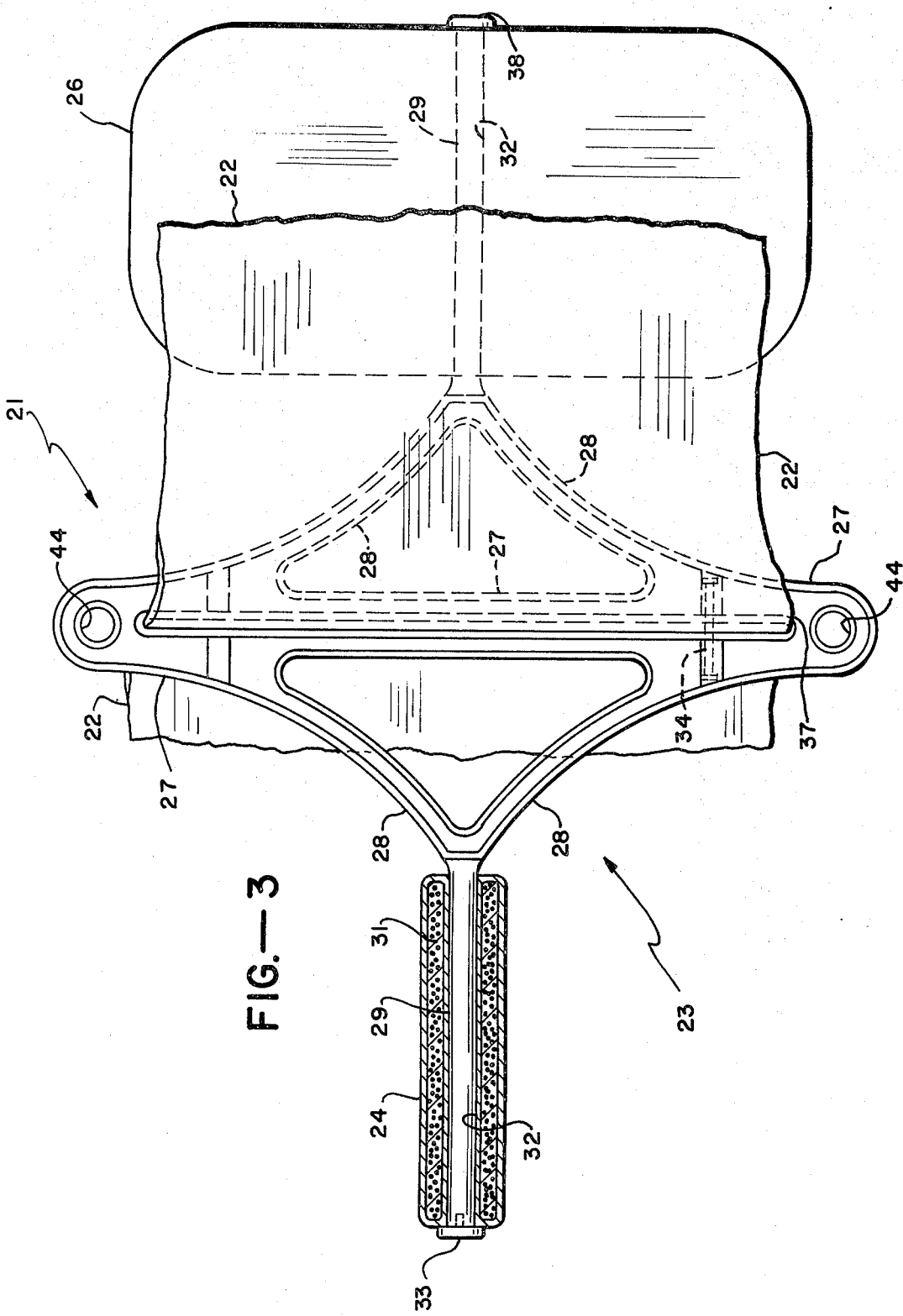
FIG.—3

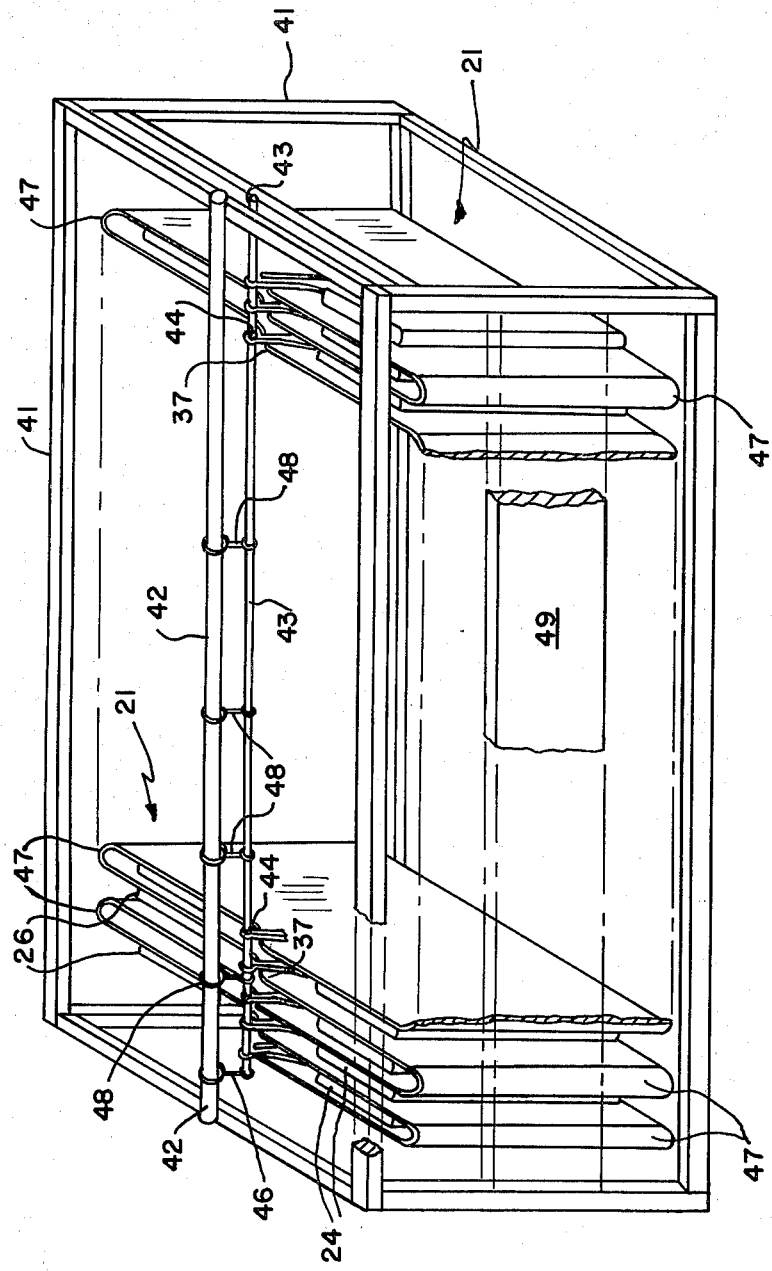
FIG.—4

3,922,860

FLOATING BOOM HAVING ROTATABLE FLOAT ELEMENTS

BACKGROUND OF THE INVENTION

The recent awareness of the serious ecological damage resulting from the accidental discharge of pollutants into bodies of water has caused a renewed interest in systems for preventing and controlling pollutant spills. Prevention is undoubtedly the best solution to the problem, but once the pollutant has been spilled, its early containment and control is essential. certainly one of the most important pieces of apparatus in the containment and control of oil spills on bodies of water is the floating boom. Once the liquid pollutant has been contained effectively by a boom, it can be skimmed from the water surface, absorbed, coagulated, etc.

Numerous floating boom systems have been evolved, but experience has indicated that they often lack desirable or absolutely necessary features for effective use. For example, one type of boom which has frequently been employed as a barrier is the log-type boom having a dependent weighted flexible skirt of partition, such as is shown in U.S. Pat. Nos. 3,499,290 and 3,476,246. Alternatively, the log-type floatation is chained or attached to the sides of a partition as in U.S. Pat. No. 3,537,587. Some booms employ involved frameworks, such as the boom of U.S. Pat. No. 3,499,291, and some have combined such frameworks with weighted skirts, such as is shown in U.S. Pat. No. 3,584,462.

Still further, floating booms have been developed in which the float elements are relatively permanently secured periodically along the length of a partition, usually a relatively rigid partition, such as is shown in U.S. Pat. Nos. 3,731,491 and 3,739,584. There have been numerous other related boom systems having specialized features making their use in certain applications advantageous, for example, the boom systems of U.S. Pat. Nos. 3,584,462; 3,613,377; 3,638,430; 3,645,099; 3,685,296; 3,686,870; and 3,695,042.

Individually and collectively these prior boom systems have exhibited one common problem, namely, the boom that were easy to deploy did not perform well in the water, and the booms that performed well in the water were not easy to deploy. Thus, various trade-offs between deployment and stability can be found in the prior art systems. In many instances, the floating booms are only suitable for permanent installation in the water, often after a very tedious and time-consuming installation process. Having experienced considerable problems in connection with the repeated deployment and retrieval of prior art booms, I have previously devised a highly stable floating boom having a greatly increased deployment and retrieval time. This floating boom is set forth in detail in U.S. Pat. No. 3,807,178 and includes a flexible partition to which float means can be rapidly attached and removed. The float means include outrigger-type floats which provide the partition with a high degree of stability. This boom through actual use has proven to save a very substantial amount of time when repetitive deployment and retrieval is required. I have found, however, that further time-saving can be accomplished without in any way detracting from the stability achieved by my prior boom structure.

Accordingly, it is an object of the present invention to provide a floating boom having improved deployment and retrieval characteristics and a very high degree of stability in the water.

It is a further object of the present invention to provide a floating boom which can be stored in a very compact package and can be easily transported in such package.

It is a still further object of the present invention to provide an improved method for deployment and retrieval of a floating boom which reduces the overall time required.

It is still another object of the present invention to provide a floating boom which is easy and inexpensive to manufacture, has improved performance characteristics in the water, is durable and relatively impervious to pollutants, and is constructed in a manner allowing interchangeability of parts.

The floating boom and method of the present invention have other objects and features of advantage which are set forth in or will be apparent from the following description and the accompanying drawing.

SUMMARY OF THE INVENTION

The floating boom of the present invention includes an elongated partition, and a plurality of float means mounted to the partition at periodic intervals over the length thereof, each float means including a pair of float elements disposed on either side of the partition. The improvement of the present invention is comprised, briefly, of the float elements being rotatably mounted to the remainder of the float means for rotational movement to and from a deployed position and a relatively rotated stored position, the float elements being further formed to enable a reduction in the overall bulk of the boom when the float elements are in the stored position. The float elements are further preferably mounted to the remainder of the float means in a manner causing the combination buoyancy and gravity forces to bias the float elements to the deployed position. Additionally, the partition is preferably formed as a flexible member, the float means are mounted to the partition for flexure of the partition, and the combination of rotation of the float elements to the stored position and relative movement of the float means and flexure of the partition enables a substantial reduction in the overall bulk of the boom for storage. The float elements are preferably formed as plate-like members, and the float means includes a frame relatively permanently mounted to the partition.

The method of the present invention is comprised, briefly, of the steps of folding a flexible elongated sheet-like partition back and forth upon itself with float means mounted to the partition positioned between folds of the partition and rotatable plate-like float elements rotated on the float means to a stored position parallel to and between adjacent folds of the partition; retaining the partition in the folded position by retainer means; releasing the retainer means; and deploying the partition by pulling the partition in a direction along its length to distend the folds of the partition and free the float elements for rotation to the deployed position.

DESCRIPTION OF THE DRAWING

FIG. 1 is a top perspective view of a floating boom constructed in accordance with the present invention and deployed in a body of water.

FIG. 2 is an enlarged, fragmentary, side elevational view of a section of the floating boom of FIG. 1.

FIG. 3 is a side elevational view of the boom corresponding to FIG. 2, but with the frame of the float means and the portion of the partition on which it is mounted twisted by 90° and one float element rotated by 90°.

FIG. 4 is a top perspective view of a floating boom storage and deployment container with the boom constructed in accordance with the present invention shown in stored position therein.

DESCRIPTION OF THE PREFERRED EMBODIMENT

Referring now to FIG. 1, the floating boom of the present invention, generally designated 21, is comprised of an elongated partition or barrier 22, preferably having a sheet-like configuration, and a plurality of float means, generally designated 23, mounted to partition 22 at periodic intervals over the length of the partition. Each float means 23 includes a pair of float elements 24 and 26 with one float element disposed on each side of partition or barrier 22. As thus far described, the floating boom of the present invention is not novel and may be constructed in a manner analogous to the floating boom described and set forth in my prior U.S. Pat. No. 3,807,178. This type of boom construction affords a highly stable floatation barrier in that the float elements are disposed and extend laterally of each side of the partition to provide a very high boom righting moment. Thus, this type of boom construction will resist strong waves, high currents, and can even be towed in a catenary position. In my prior boom structure, storage of the boom was accomplished by removing the float elements from the partition and storing them separately from the partition so as to reduce the overall bulk. The floatation for the partition was formed with a frame allowing rapid removal from and attachment to the partition.

In order to provide a floating boom which can be compactly stored and transported without the need for separation of the floatation from the barrier portion of the boom, and further in order to improve the stability of the boom in the water, the improved floating boom of the present invention includes float elements 24 and 26 which are rotatably mounted to the remainder of float means 23 for rotational movement to and from a deployed position (shown in FIGS. 1, 2 and the left side of FIG. 3) and a relatively rotated stored position (shown in the right side of FIG. 3 and in FIG. 4). Float elements 24 and 26 are further formed to enable reduction of the overall bulk of the boom when the float elements are in the stored position, and are, of course, formed to provide the substantial buoyancy required for floating of the partition, particularly in the deployed position as shown in FIG. 1, but also in a stored position, as will be described hereinafter.

The rotational mounting of float elements 24 and 26 to the remainder of float means 23 can best be understood by reference to FIGS. 2 and 3. Mounted to partition 22 is a float means frame 27 having laterally outwardly extending arms 28 which terminate in an arm axle portion 29. Float elements 24 and 26 are preferably formed as hollow plate-like members having a foam material 31, such as polyurethane foam, disposed therein. A central opening or bore 32 dimensioned for sliding receipt on axle portion 29 is provided in the float element. Float elements 24 and 26 are held on axle portions 29 by an end retainer 33, which prevents axial sliding of the floats off arm portions 29 and yet permits rotation of the float elements about axle portions 29.

In order to cause the combination in buoyancy and gravitational forces to bias the rotating float elements to the deployed position of FIG. 2, it is preferable that laterally extending opening 32 through the float elements be positioned at about the midpoint of the height or thickness of the plate-like float elements and at about the midpoint of the length of the float elements. Thus, the center of gravity and center of buoyancy of the float elements will pass approximately through axle portion 29 with the float element being substantially rotationally biased or balanced to a horizontal position as shown in FIG. 2 by equal and opposed buoyancy forces which act on the float elements. If the boom is placed in the water, therefore, the plate-like configuration and mounting of the float elements to the axle portion of the arms will cause the float elements to rapidly assume a horizontal position, even though they initially are vertically oriented or otherwise skewed or inclined to the top surface of the water.

Since it is not necessary to separate the floatation from the barrier of the boom of the present invention, frame 27 may be substantially permanently affixed to partition 22 by means of pins, rivets or similar fasteners 34 which pass through the frame and partition. It will be understood, however, that it is possible for the floatation frames to be removably mounted to partition 22.

As shown in the drawings, frames 27 of float means 23 are substantially symmetrical with arms 28 extending substantially horizontally and perpendicularly from partition 22. Each frame is mounted to the partition in a substantially vertical orientation, and the float elements are symmetrical about axle portions 29 of the frame arms. This construction enables the boom to be deployed with either edge extending above the water. Thus, there is no "top" or "bottom" of the boom, and each float element provides the same degree of buoyancy and stability regardless of which direction the float element rotates to reach the horizontal position of FIG. 2, that is, float element 24 can be rotated by 180° without affecting the stability and buoyancy. Deployment of the boom, therefore, does not require the user to be careful in orienting one edge as the top of the boom or to be careful in causing all of the float elements to have the same sides resting on the water.

An important feature of the present invention resides in the size of plate-like float elements. It has been found that plate-like float elements are superior to spherical and cylindrical elements, particularly when the boom is being towed. The boom of the present invention can be towed at relatively high-speed without becoming unstable or having the partition lay over and lose its effectiveness. When towed at 2 to 3 knots, the rotational mounting of floats 24 and 26 will cause the floats to occasionally rotate or "paddle wheel." When the towing speed is increased to 5 to 6 knots, the floats become stable and actually plane on the water surface. The rotational mounting of the floats causes them to assume a slightly upwardly canted position in the direction in which they are being towed.

It is hypothesized that several factors may contribute to the planing action of the float elements. Most important is the plate-like construction with its attendant substantial horizontally extending area providing substantial buoyancy for a small depth of immersion of the float. Cylindrical and spherical floats will dig-in or tend to dive when towing above 3 to 4 knots. The plate-like floats of the present invention need be immersed in the body of water to a much lesser depth than cylindrical or spherical floats to provide the same buoyancy. It is preferable that the floats of the present invention have a substantial excess buoyancy than required for the boom that they support which minimizes the depth to which the floats are submerged. For example, a reserve or excess buoyancy of 5.0 times the required buoyancy and more preferably at least 7.5 times the required buoyancy makes the plate-like floats plane or skim across the water upon high-speed towing. Rotational mounting may further add to the planing ability since the plate-like float is free to assume an angularly inclined position which favors planing.

It is also preferable that the float elements of the present invention be formed with side edges 36 which are upwardly beveled in relation to the water surface on which they ride so as to facilitate towing and better righting characteristics of the float elements. Again, since either side of the float elements may engage the water, it is preferable that both the upper and lower surfaces of edges 36 be beveled or otherwise arcuately formed to resist catching or digging in of the front edges of the float elements under wave action, currents and the like.

It should be further noted that rotationally mounting float elements 24 and 26 to the frame of float means 23 has the additional advantage that under wave action the float elements will be constantly rocking or pitching about horizontal axle portion 29 and therefore exhibit a substantially improved conformance to the wave action. With the float elements rotating in conformance to the wave action, the buoyancy and righting moment of the boom is maximized and enhanced over that achieved when a float element is rigidly secured to the arm of the floatation frame. Moreover, a wave which passes over the top of the float elements will not tend to cause the float elements to dive or be submerged, but instead will rotate the forward side of the float element down with the rear side coming up to resist the wave action and/or completely rotate the float element by 180°. Thus, the float elements are rotationally mounted to float means 23 tend to rock or rotate through large waves rather than carry the partition downwardly under wave action and permit the escape of pollutants. This wave conformance also allows the partition to be maintained at a more nearly vertical orientation.

A primary feature of the present invention is that the rotational mounting of float elements 24 and 26 to float means 23 affords a very substantial reduction in the overall bulk of the boom when the boom is to be stored. This reduction in volume, which allows storage of the boom with the floatation mounted to the partition, can best be understood by comparison of FIGS. 2 and 3 and reference to FIG. 4. In FIG. 3, float element 24 on the left side of float means 23 is in the horizontal position, substantially as is shown in FIG. 2. Float element 26 on the right-hand side of float means 23, however, has been rotated by 90° and is in a generally vertical orientation. If both float elements 24 and 26 are rotated from the deployed position of FIG. 2 to the vertical stored position shown on the right-hand side of FIG. 3, it is possible to align the generally vertically oriented frame 27 and the vertically extending float elements 26 in generally parallel relation to the vertically extending partition or barrier 22. Such alignment of the float elements, frame and partition enables a very substantial reduction in the overall bulk of the boom which enables storage of the boom in a compact configuration, array or package. In addition to rotating the float elements to the vertical stored position, it is necessary to further rotate or twist the frame and float elements by 90° about a vertical axis through the belt and frame so as to position the frame and float elements in close proximity to the belt.

This is preferably accomplished in the boom of the present invention by forming partition 22 as a flexible member with the float means 23 mounted to the partition for flexure of the partition through about 90°. Thus, partition 22 in FIGS. 2 and 3 has been flexed from its position in FIG. 2 to allow rotation of frame 27 of the float means by about 90°. This results in a twisting or flexure of partition 22 at 37 proximate the mounting of the frame to the partition. The combination of rotation of the float elements about a horizontal axis to the stored position and relative twisting or rotational movement of the float means and flexure of partition 22 about a vertical axis, until both of arms 28 (including arm portions 29) are proximate partition 22 over the length of the arms, positions the vertically oriented float elements 24 and 26 in close proximity to the belt or partition 22, which in turn allows the partition to be folded back and forth upon itself to form a very compact package, as is shown in FIG. 4.

In order to provide the desired flexibility and yet the overall strength which eliminates the need for chains or cables running down the length of the boom, it is preferable to form barrier or partition 22 from fabric reinforced rubberized belting such as is commercially available for conveyer belts and the like. The basic material may be natural synthetic rubbers or plastics reinforced with fibers or fabric. The belting has a thickness of approximately one-quarter inch, a strength along the belt of 1800 pounds per inch of width of belting, and comes in widths which can vary from 1 to 4 feet, or more if desired. The length of the belting can be in any convenient length, but 100-foot long lengths have been found to be highly advantageous.

FIG. 4 shows one form of packaging or containerizing of the boom of the present invention. A box-like container or frame 41 is provided with a pair of centrally disposed longitudinally extending rail elements 42 and 43. Mounted to lower rail element 43 is boom 21. As best may be seen in FIG. 3, the upper and lower portions of boom 21 are formed with circular openings 44 which act as guide means or rail engaging hooks for sliding engagement with and mounting on rail 43. Openings 44 can also be advantageously used for securement of anchor lines to the boom or for towing or similar manipulation of the boom in the water.

In order to store the boom in the box-like frame, which acts as a retainer means, the end connecting element 46 between rails 42 and 43 can be released from the end of rail 43. The endmost float means 23 of the boom is then threaded onto rail 43 by sliding the opening 44 of the frame of the float means onto the rail. Both the float elements 24 and 26 are rotated to the vertical stored position, and the belt is flexed so that it assumes an orientation proximate and parallel to the float elements. The partition or belt extends to a position beyond the length of the float elements and then is folded at folds 47 back around the float elements and toward center rail 43. At the point at which the belt again reaches the center rail, the second float means 23 can be mounted by means of opening 44 onto rail 43. The belt is twisted at 37 through two 90° turns proximate the frame of the float means and then continues out to the other side until it extends beyond the float elements, at which point it is folded back upon itself at 47 and extends again toward rail 43. Thus, the float means with the float elements are positioned between adjacent folds of the partition with the float elements rotated to and held in the stored position by the folds of the partition. The folding of the belt back and forth upon itself and trapping of float elements between the folds in the stored position continues until the entire length of rail 43 has been filled with boom.

In order to hold rail 43 in generally parallel spaced relation to rail 42 and yet permit sliding of the frames onto rail 43, a plurality of spacer links 48 are slidably mounted to both the rails 42 and 43. The end link 46 can be fixedly secured to rail 43 so as to retain or hold the package of folded boom against pulling apart. As the boom is pulled off of rail 43, spacer elements 48 are sequentially pulled off of the end of rail 43, but not off rail 42. Conversely, when the boom is being mounted on rail 43, the connecting links 48 can be periodically interspersed between the float means so as to provide support for rail 43 over its length.

In operation, boom 21 can be folded up in box or retainer means 41 for storage and/or transportation. In this folded position, approximately 100 feet of 2-foot high boom can be stored in a box 7-½ feet long, 30 inches high and 46 inches wide. A plurality of such boxes or packages can be mounted on a pier or a boat to provide a storage and boom deployment facility. The boxes can also conveniently act as transporting containers and be used to transport the partition or boom in the folded position to a deployment site.

In order to deploy the boom, one need only release end retainer element 46, grab the end of the belting or partition 22 and pull the partition off rail 43 to distend the folds of the partition. With the folds of the partition distended, the float elements 24 and 26 automatically rotate or flop under the gravity and buoyancy forces to the deployed horizontally oriented position. Using this technique, it has been possible to deploy 100 feet of boom in as little as 15 seconds. This means that it is not necesary to have the boom deployed in the water as all times in order to have the capability of rapidly containing oil spills. Instead, the boom can be stored in a compact storage area and rapidly deployed with successive sections of booms linked together as they are deployed. As will be readily appreciated, longer lengths of boom than 100 feet can be stored in box-like containers, and it would also be possible to link sections of boom together as stored on a continuous rail system.

When the boom is retrieved, it may simply be pulled into container 41 with each frame element mounted on rail 43 and the float elements rotated to the stored position. The storing of the boom requires more time than its deployment, but can be relatively rapidly accomplished, and the time required for storing is not nearly as critical as the time required for deployment.

It is further highly advantageous to provide the container or frame 41 with floatation means, such as side panels 49 extending around three sides of frame 41. The floatation panels 49 can be used to float the entire package in a body of water. It should be noted that float elements 24 and 26 cause the boom 21 to float when the boom package is immersed in the water. The amount of buoyancy in panels 49 can be selected so that the folded boom 21 will float within the floating frame 41 in almost a weightless condition. This takes virtually all of the weight of the boom off of rail 43, which greatly facilitates sliding the boom off the rail. A frame 41 provided with floatation panels 49 can be towed in the water by a boat or even air dropped to provide a very high degree of mobility for the boom. As will be understood, numerous other types of containers or retainer structures can be employed to retain the boom in a folded package, including a simple band passed around the folded boom and then cut at the deployment site to release the boom.

The float means of the present invention are shown in a form suitable for injection molding from a plastic material such as nylon. It will be understood, however, that frame 27 can be advantageously formed of other materials and other configurations. For example, frame 27 can be formed from stainless steel providing outwardly extending arms on which the float elements can be rotatably mounted. Similarly, the frame is shown with arms which space the float elements at a distance from the partition and provide a triangular opening in the arms for passage of oil and water between the float elements and the partition. This is a preferred form of construction; however, it is possible to obtain the advantages of the present invention by a float means frame in which the float elements are mounted in immediate proximity to the partition. Moreover, the float elements themselves can be formed in a number of different configurations and from different materials. It is preferable to rotationally mold the float elements from a plastic material such as nylon and then fill the float elements with a foam, such as polyurethane. The quantity of foam and size of the float elements depends upon the buoyancy desired and the intervals at which the frames are to be spaced along the sheet-like partition. Typically, the frames are spaced at about four foot intervals and the float elements are about three inches in thickness by 24 inches in length and 12 inches in width. Finally, the end sections of the belting are normally provided with connecting means (not shown) which allows the sections to be linked together to any desired overall length of the boom.

What is claimed is:
1. In a floating boom having an elongated sheet-like partition, and a plurality of float means mounted to said partition at periodic intervals over the length thereof and formed to support said partition in a substantially vertical orientation, each said float means including at least one float element disposed on one side of said partition, the improvement comprising:
   each said float element being mounted to the remainder of said float means and said float means being formed to permit angular displacement of said float element with respect to said float means to and from a deployed position and a relatively rotated stored position about a substantially horizontal axis extending in said deployed position substantially perpendicularly to said partition and passing substantially through the center of buoyancy of said float element to permit rotation thereof under dynamic fluid forces, said float element being further formed as a plate-like member oriented in a horizontal plane in said deployed position to provide a reduction of the overall bulk of said boom when said float element is in said stored position.
2. A floating boom as defined in claim 1, wherein, said float means is formed to provide means for mounting said float element thereto in a manner causing the combination of buoyancy and gravity forces to bias said float element to said deployed position.

3. A floating boom as defined in claim 2, wherein,
said partition is formed as a flexible member, said float means are mounted to said partition for flexure of said partition about a substantially vertical axis permitting the combination of rotation of said float element to said stored position and relative angular displacement of said float means about said vertical axis and flexure of said partition to effect a substantial reduction in the overall bulk of said boom for storage.

4. A floating boom as defined in claim 1 wherein,
said float means includes a frame relatively permanently mounted to said partition and having arms extending from each side of said partition, and said float elements are formed as plate-like members and are rotatably mounted to said arms for orientation of said plate-like members in a substantially horizontal plane in said deployed position and rotation to a substantially vertical plane in said stored position.

5. In a floating boom having an elongated partition, and a plurality of float means mounted to said partition at periodic intervals over the length thereof, each said float means including a frame and a float element mounted to said frame and disposed on one side of said partition, the improvement comprising:
each said float element being mounted to said frame and said frame being formed to provide means permitting rotational movement about a substantially horizontal axis extending substantially perpendicular to said partition and passing substantially through the center of buoyanacy of said float element to permit rotation thereof under dynamic fluid forces, and said float element being formed as a plate-like member oriented in a horizontal plane having a substantial horizontally extending area adapted for immersion in a body of water to provide substantial buoyancy for a small depth of immersion of said plate-like member.

6. A floating boom as defined in claim 5 wherein,
said float elements have a reserve buoyancy in excess of about 5 times the required buoyancy to float said boom.

7. In a floating boom having an elongated sheet-like partition at periodic intervals over the length thereof, each said float means including a vertically extending frame having at least one arm extending outwardly from one side of said partition and a float element mounted to said arm and disposed on said side of said partition, the improvement comprising:
said partition being formed for flexure thereof about a vertical axis proximate said frame, said frame being mounted to said partition for selective angular displacement of said frame about a vertical axis and resultant twisting of said partition proximate said frame until said arm is displaced from a position extending outwardly of said partition to a position proximate said partition over the length of said arm; and
said float element being mounted to said arm and said arm being formed to provide means for selective rotation of said float element with respect to said arm to and from a stored position and to and from a deployed position angularly displaced from said stored position, said float element being formed with a center of gravity and a center of buoyancy relatively positioned to automatically bias said float element to said deployed position upon positioning said boom in a body of water, said float element being further formed to provide a reduction of the overall bulk of said boom when said float element is in said stored position.

8. A floating boom as defined in claim 7 wherein,
said float element is formed as a plate-like member and said arm is formed to provide means for rotation of said float element about said arm on an axis causing said plate-like member to be substantially horizontally oriented when said boom is deployed in a body of water.

9. A floating boom as defined in claim 8 wherein,
said float elements are formed with longitudinally extending side edges having upwardly beveled surfaces, and said float elements are mounted to said arms at about the midpoint of the thickness of said float elements and at about the midpoint of the length of said float elements.

10. In a floating boom having an elongated sheet-like partition and a plurality of float means mounted to said partition at periodic intervals over the length thereof for support of said partition in a substantially vertical orientation, said float means each including at least one float element extending outwardly of said partition from one side thereof, the improvement comprising:
said float means being formed for and mounted to said partition of angular displacement of said float means about a substantially vertically oriented axis, said float element being mounted to the remainder of said float means and said float means being formed for angular displacement of said float element with respect to said float means about a second axis inclined with respect to and intersecting with said vertically oriented axis, said float element being formed with an asymmetrical configuration, and said float element being selectively movable between a deployed position extending outwardly of said partition and a stored position proximate said partition by a combination of angular displacement of said float means about said vertiically oriented axis and angular displacement of said float element about said second axis until said asymmetrical configuration of said float element is oriented in a position effecting a substantial reduction in the overall bulk of said boom.

* * * * *